Aug. 28, 1934. F. J. MILES 1,971,791
FREEZER
Original Filed May 7, 1930 2 Sheets-Sheet 1
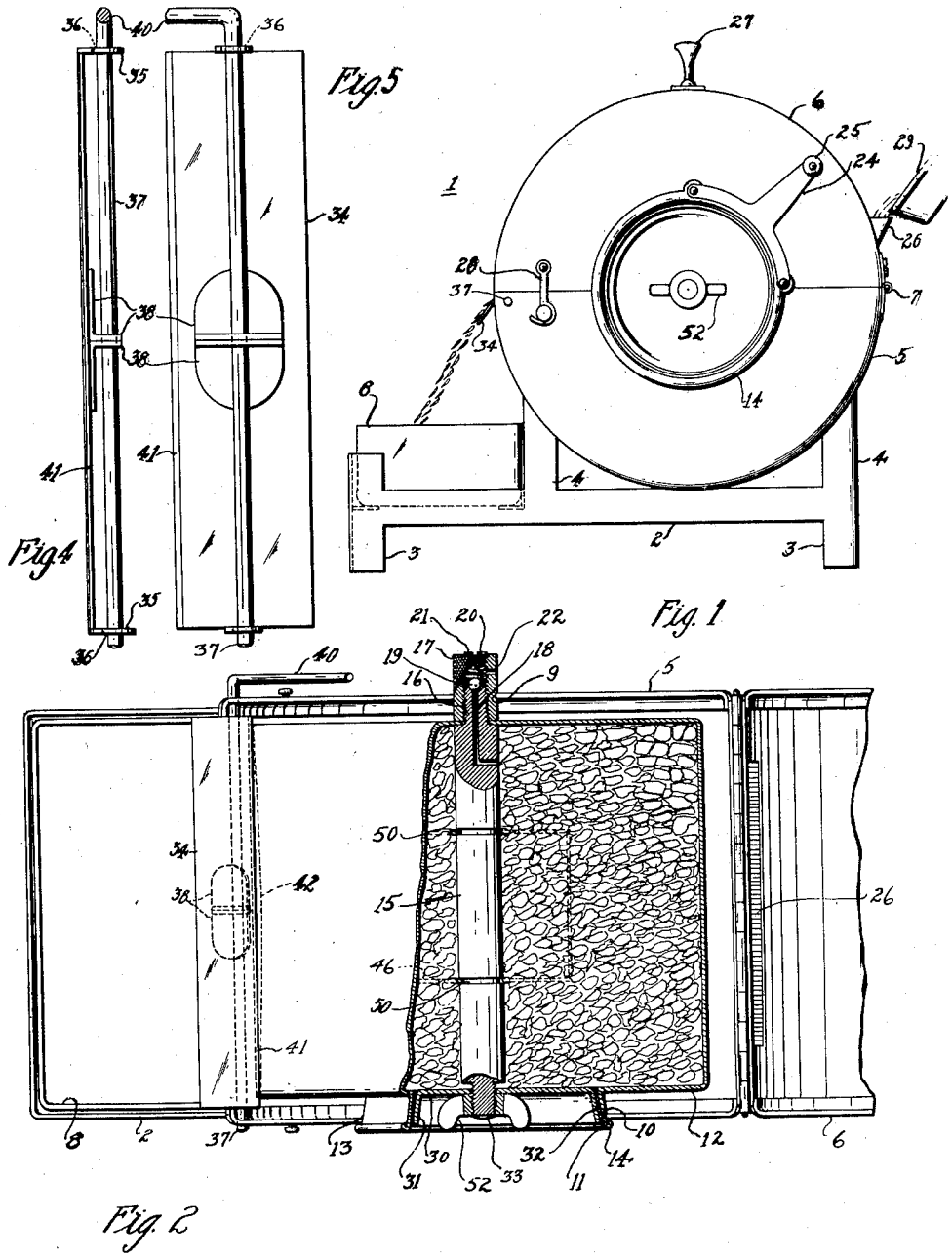
INVENTOR.
Frederich J. Miles
BY
George D. Richards
ATTORNEY.

Aug. 28, 1934.　　　　F. J. MILES　　　　1,971,791
FREEZER
Original Filed May 7, 1930　　2 Sheets-Sheet 2

INVENTOR.
Frederick J. Miles
BY
George D. Richards
ATTORNEY.

Patented Aug. 28, 1934

1,971,791

UNITED STATES PATENT OFFICE 1,971,791

FREEZER

Frederick J. Miles, New Providence, N. J., assignor to Milton B. Levin, Elizabeth, N. J.

Refiled for abandoned application Serial No. 450,363, May 7, 1930. This application May 4, 1934, Serial No. 724,187

6 Claims. (Cl. 257—98)

This invention relates to freezers, and the invention has reference, more particularly, to a novel freezer for solidifying liquids and for depositing the same in flakes or portions ready for consumption.

The principal object of the present invention is to provide a novel freezer having a revolvable freezing drum contained within a casing adapted to receive the liquid to be frozen, and a scraper blade mounted on said casing and being so constructed and arranged as to conform to the peripheral surface contour of the drum for completely scraping the frozen liquid therefrom.

Another object of the present invention lies in the provision of a freezer having an external portable receptacle adapted to directly receive frozen liquids ejected by the scraper blade, the said receptacle being easily accessible for removal without the necessity of opening the casing of the freezer.

Another object of the present invention is to provide a freezer which may employ various freezing mediums, including dry ice and being constructed and arranged so as to provide for uniform cooling of the freezing surfaces of the drum and to permit the escape of gases from therewithin.

Still another object of the present invention lies in the provision of a freezer of simple, sanitary construction and which is inexpensive to manufacture, the same being reliable and rapid in its freezing action.

Other objects of the present invention, not at this time more particularly enumerated, will be clearly understood from the following detailed description of the same.

The invention is clearly illustrated in the accompanying drawings, in which:—

Fig. 1 is a view in side elevation of the novel freezer of the present invention, the same being illustrated as receiving liquid to be frozen at the rear thereof and ejecting the frozen material at the front thereof and into the removable receptacle;

Fig. 2 is an enlarged plan view of the structure shown in Fig. 1 with parts broken away, the casing being shown in open position;

Fig. 3 is an enlarged side view of the freezer with parts broken away and illustrates the use of dry ice as a freezing medium;

Fig. 4 is an edge view of the scraper blade of the invention;

Similar characters of reference are employed in the above described views, to indicate corresponding parts.

Figure 5:
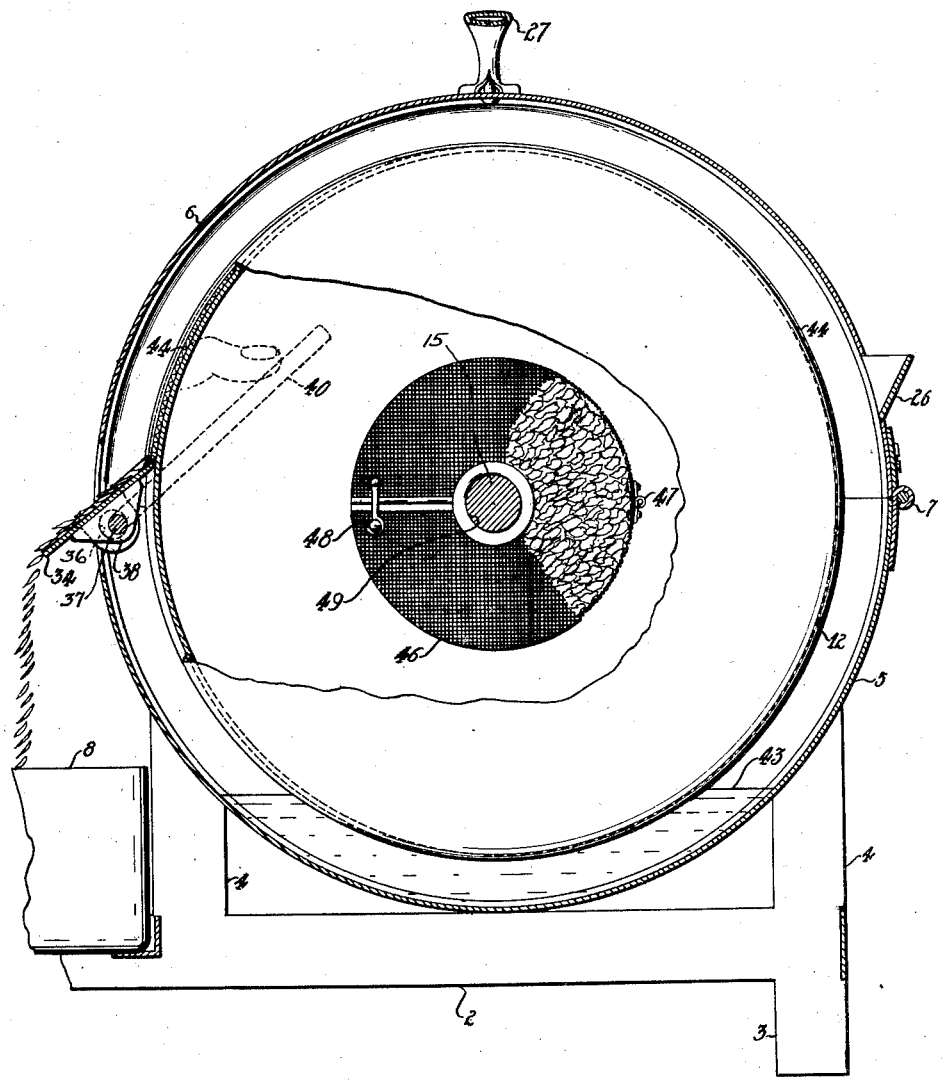
Fig. 5 is a plan view of the same.
Figure 6:
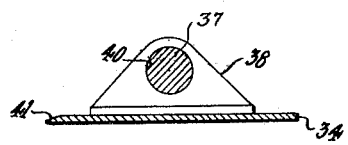
Fig. 6 is a sectional view of the scraper blade.

Referring now to said drawings, the reference numeral 1 designates the novel freezer of this invention as a whole. Freezer 1 comprises a base 2 of substantially rectangular shape in plan having legs 3 at its corners. The rear portion of base 2 is provided with uprights 4 which support the body section 5 of a substantially cylindrical casing having a cover section 6 hingedly connected along its rear edge as by hinge 7 to the body section 5. The body section 5 and the cover section 6 are each substantially semi-cylindrical in shape and are preferably formed from sheet metal as is also the base 2. Body section 5 is secured, as by welding, to the uprights 4 of the base 2. The forward portion of base 2 is formed to provide a support for a removable receptacle or tray 8. Receptacle 8 receives the material frozen by the freezer.

The body section 5 and the cover section 6 are provided at their sides with semi-circular cooperating apertures which form, when the cover section 6 is closed upon body section 5, circular bearings 9 and 10 at the sides of the casing and aligned with the longitudinal central axis thereof for receiving and supporting a freezing unit. This freezing unit comprises a drum 12 preferably formed from relatively thin sheet metal so that heat may be conducted from the exterior to the interior thereof quickly. Drum 12 is provided at one side thereof with an outwardly extending annular flange 12, preferably having its outer edge rolled or beaded over, as shown at 14. Annular flange 13 is outwardly flared or beveled as especially shown in Fig. 2 to provide a circular axial opening 11 having tapered walls through which aperture a suitable cooling medium, such as ice, may be inserted into the interior of the drum 12.

A shaft 15 extends axially within drum 12 and has a reduced threaded extension 16 extending through an axial aperture provided in the side of drum 12 opposite to opening 11. A nut 17 is threaded upon extension 16 and abuts the exterior side wall of drum 12 to thereby rigidly hold shaft 15 centrally within this drum. Shaft 15 is provided with a vent passage 18 extending centrally through the extension 16 and communicating with the interior of drum 12. A ball valve 19 normally closes the mouth of passage 18 owing to the pressure of a spring 20 contained within the hollow interior of nut 17 and pressing at one end against ball valve 19 and at its other end against a plug 21 threaded into the nut 17. The development of fluid pressure within drum 12 in excess of atmospheric pressure, such as may be caused by the evaporation of dry ice therewithin will force ball valve 19 from its seat, thereby permitting such gas to escape from the interior of drum 12 through passage 18 and aperture 22 provided in nut 17 into the atmosphere. Nut 17 and flange 13 supporting the drum 12 are rotatably mounted within the bearings 9 and 10, respectively, provided in the casing 5—6 and a crank 24 secured to flange 13 carries a handle 25 which may be revolved to turn drum 12 within casing 5—6. The drum 12 is somewhat smaller than the interior diameter of casing 5—6 so that there is provided an annular space between the outer circumferential surface of drum 12 and the inner circumferential surface of casing 5—6 for receiving the liquid to be frozen.

A chute or mouth 26 is pressed out from cover section 6 for receiving the liquid to be frozen which is illustrated in Fig. 1 as being poured into chute 26 from a pan 29. Cover section 6 is adapted to be retained in closed condition upon body section 5 by catches 28 at the sides of these members. A lifting handle 27 is provided on cover 6 for turning this cover section about hinge 7 and for carrying the freezer about.

The aperture 11 of drum 12 is adapted to be closed by a closure member or plug 30 formed preferably of sheet metal and having a flared peripheral flange 31 conforming to annular flange 13. A washer 32 of fibrous material is shown overlying and secured to flange 31 to provide a fluid tight joint between plug 30 and drum 12. Plug 30 is provided with a central aperture through which a reduced threaded end portion 33 of shaft 15 projects. A wing nut 52 is threaded upon end portion 33 and engages plug 30 to thereby retain this plug firmly within opening 11 provided in drum 12.

A scraper blade 34 is provided for scraping or removing the frozen material from drum 12 and for depositing this material in receptacle 8. Scraper blade 34 is made of thin resilient material such as steel and is formed with lugs 35 at its ends. Lugs 35 extend at right angles to the blade 34 and have circular aligned apertures 36 which loosely surround the blade carrying shaft 37. Scraper blade 34 is secured substantially midway of its length by angle brackets 38 to the shaft 37. Shaft 37 extends through apertures in brackets 38 and these brackets are secured as by soldering or welding to the shaft 37 and to the central portion of blade 34. Shaft 37 is pivotally mounted in bearings provided in the body section 5 and has an offset handle portion 40 formed at one end thereof.

By turning handle portion 40, the scraper blade 34 may be caused to revolve with shaft 37 so that its scraping edge 41 operatively engages the outer circumferential surface of drum 12. Since this drum is made of thin material in order that heat may pass through the walls thereof quickly, the pressure of blade 34 in use, will normally cause the circumferential surface of the drum to yield or bend inwardly at points between the supporting sides of the drum, so that this circumferential surface becomes deflected or curved inwardly along a line such as line 42, shown in Fig. 2. Since the blade 34 is resilient and is attached at its center to shaft 37, the operative pressure upon handle 40 will cause the central portion of blade 34 to also deflect inwardly and engage the incurved surface of the drum regardless of the degree of curvature of this surface. The loose fit of lugs 36 upon shaft 37 permits the deflection of the central portion of the blade 34 inwardly to conform to the circumferential surface of the drum. By thusly constructing the scraper blade so that its scraping edge 41 conforms to the curvature of the drum while in use, all frozen material is removed from the surface of the drum by the blade, thereby continuously maintaining the high heat transmitting efficiency and freezing capacity of the drum.

In use, when a salt and ice or a similar mixture is used as the freezing medium, the mixture is inserted into drum 12 through opening 11 and this opening is then closed by closure member 30. The liquid 43 to be frozen is then poured into casing 5—6 through chute or mouth 26 partially filling body section 5, whereupon the drum 12 is revolved by turning crank handle 25 while the scraper blade 34 is held in engagement with the circumferential surface of this drum. The liquid is frozen upon drum 12 in a thin sheet 44 which upon reaching the scraping edge 41 is scraped off of the drum and conveyed by the scraper blade so as to fall into receptacle 8. Since the scraping edge 41 closely engages the circumferential surface of the drum all along the length thereof, all of the sheet 44 is removed leaving the surface of the drum clean and smooth and enabling the same to quickly freeze more liquid 43 upon subsequent immersion thereinto. When the receptacle 8 becomes filled with frozen material it may be readily removed by merely lifting the same from base 2.

In the event that substances such as dry ice are used as the cooling medium, such cooling medium is placed in a wire mesh basket 46 illustrated in Fig. 3 as comprising two semi-cylindrical halves which are hinged together at 47 and are provided with catches 48. Basket 46 is formed with circular axial apertures 49 in its sides to enable this basket to be slipped onto shaft 15 of the freezing unit. Basket 46 is positioned on shaft 15 midway of the width of drum 12 so as to provide for uniform cooling of all portions of the circumferential surface of the drum. Shaft 15 is illustrated as provided with angular grooves or recesses 50 (see Fig. 2) into which the marginal edges of apertures 49 snap or engage to thereby retain the basket 46 centrally within drum 12. Vapors or gases formed during the evaporation of the dry ice may escape through vent passage 18 past valve 19 to the atmosphere.

It will be noted that the novel freezer of this invention is of exceedingly simple construction and may be made cheaply in large quantities, the same consisting largely of sheet metal parts. The scraper blade is an important feature of the freezer of this invention for the peculiar construction of this blade enables a central drive or actuation thereof and causes the edge 41 to conform to the surface of the drum, thereby permitting the use of a light sheet metal drum of cheap construction. The drum being thin has a high thermal conductivity and the complete removal of frozen material therefrom enables the drum to always operate at full efficiency.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a freezer, in combination, a container for holding a refrigerating agent, a casing in which is disposed the material to be cooled by contact with the surface of said container, a device arranged to contact with the surface of the container to effect removal of frozen material therefrom, said device being supported at its center and having floating ends, said device being flexible and capable of conforming to irregularities of the container surface due to the flexure thereof under the pressure of said device, a member supporting said device, said member being operable to force the central portion of said device against the container and to thereby cause said device to conform to the irregularities of the container surface, whereby all frozen material is removed from said container surface by said device, and a removable receptacle mounted adjacent said casing for receiving the frozen material removed by said device.

2. In a freezer, in combination, a casing, a rotatable freezing drum contained within said casing, said drum being spaced from the inner walls of said casing to provide a receiving space for the material to be cooled by contact with the peripheral surface of said drum, a scraper device arranged to contact with the peripheral surface of said drum to effect removal of frozen material therefrom, said device being transversely flexible and adapted to conform to the peripheral surface of said drum when said surface is deflected in use owing to the pressure of said scraper device, and a member supporting said scraper device intermediate its ends and operable to cause said device to flex and conform to the deflected peripheral surface of said drum.

3. In a freezer, in combination, a casing, a rotatable freezing drum of relatively thin material contained within said casing and having a filling opening accessible from without said casing, a closure member for sealing said filling opening, valve means communicating with the interior of said drum for enabling the escape of gases from therewithin, said drum being spaced from the inner walls of said casing to provide a receiving space for the material to be cooled by contact with the peripheral surface of said drum, a scraper device arranged to contact with the peripheray surface of said drum to effect removal of frozen material therefrom, said device being flexible and adapted to conform to the peripheral surface of said drum when said surfaces is deflected in use owing to the pressure of said scraper device, and a member supporting said scraper device and operable to cause said device to conform to the deflected peripheral surface of said drum.

4. In a freezer, in combination, a casing, a rotatable freezing drum contained within said casing and having a filling opening accessible from without said casing, a refrigerant container for insertion through said filling opening to be positioned within said drum, a closure member for sealing said filling opening, valve means communicating with the interior of said drum for enabling the escape of gases from therewithin, said casing providing a space exteriorly of said drum for receiving the material to be cooled by contact with the surface of said drum, a scraper device arranged to contact with the surface of said drum to effect the removal of frozen material therefrom, said device being capable of conforming to irregularities in the surface of said drum due to the flexure thereof under the pressure of said device, and a member supporting said device, said member being operable to cause said device to conform to the irregularities of the drum surface, whereby all frozen material is removed from said drum surface by said device.

5. In a freezer, in combination, a casing having cooperating substantially semi-cylindrical body and cover sections hingedly connected together along their rear edges, a base supporting said body section, said body and cover sections having cooperating bearing halves forming circular bearings when said cover section is closed upon said body section, a revolvable freezing drum removably contained within said casing and journaled in said bearings, a scraper blade shaft journaled in the forward portion of said casing, a scraper blade carried by said shaft and rigidly connected midway of its length to said shaft, the end portions of said scraper blade being free to move transversely with respect to said shaft, and handle means provided on said shaft for urging said scraper blade into intimate contact with the surface of said freezing drum, the end portions of said scraper blade flexing to conform to said freezing drum surface, said scraper blade acting to remove frozen material from the surface of said drum.

6. In a freezer, in combination, a casing having cooperating substantially semi-cylindrical body and cover sections hingedly connected together along their rear edges, a base supporting said body section, a receptacle for frozen material removably mounted on said base exteriorly of said casing, said body and cover sections having cooperating bearing halves forming circular bearings when said cover section is closed upon said body section, a revolvable freezing drum removably contained within said casing and journaled in said bearings, a scraper blade shaft journaled in the forward portion of said casing, a scraper blade carried by said shaft and rigidly connected midway of its length to said shaft, the end portions of said scraper blade being free to move transversely with respect to said shaft, and handle means provided on said shaft for urging said scraper blade into intimate contact with the surface of said freezing drum, the end portions of said scraper blade flexing to conform to said freezing drum surface, said scraper blade acting to remove frozen material from the surface of said drum whereupon said material is deposited in said receptacle.

FREDERICK J. MILES.